US007796864B2

(12) United States Patent
Jung et al.

(10) Patent No.: US 7,796,864 B2
(45) Date of Patent: Sep. 14, 2010

(54) INFORMATION STORAGE MEDIUM CONTAINING INTERACTIVE GRAPHICS STREAM FOR CHANGE OF AV DATA REPRODUCING STATE, AND REPRODUCING METHOD AND APPARATUS THEREOF

(75) Inventors: Kil-soo Jung, Hwaseong-si (KR); Sung-wook Park, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 962 days.

(21) Appl. No.: 10/923,018

(22) Filed: Aug. 23, 2004

(65) Prior Publication Data
US 2005/0177863 A1 Aug. 11, 2005

(30) Foreign Application Priority Data
Feb. 9, 2004 (KR) .................... 10-2004-0008345

(51) Int. Cl.
*H04N 7/26* (2006.01)
*H04N 5/00* (2006.01)
(52) U.S. Cl. ...................... 386/125; 386/124
(58) Field of Classification Search .............. 386/1, 386/45–46, 125–126; 345/172
See application file for complete search history.

(56) References Cited
U.S. PATENT DOCUMENTS
5,400,077 A * 3/1995 Cookson et al. ............. 348/556

| 6,366,732 | B1 | 4/2002 | Murase et al. |
| 6,453,459 | B1* | 9/2002 | Brodersen et al. ........... 717/100 |
| 7,519,386 | B2* | 4/2009 | Kespohl et al. .......... 455/550.1 |
| 2001/0041049 | A1 | 11/2001 | Kanda |
| 2003/0182627 | A1 | 9/2003 | Chung et al. |

FOREIGN PATENT DOCUMENTS
| JP | 2001-118321 | 4/2001 |
| JP | 2001-326829 | 11/2001 |
| TW | 550507 | 9/2003 |

OTHER PUBLICATIONS

Office Action issued on Jul. 20, 2007 by the Chinese Intellectual Property Office for Chinese Patent Application No. 200510007628.5.
Office Action issued in corresponding Taiwanese Patent Application No. 094103183 dated Jul. 18, 2008.
Office Action issued on Oct. 31, 2008 in Chinese Patent Application No. 200710108926.2.
Japanese Office Action issued on Jan. 12, 2010, in corresponding Japanese Application No. 2005-028086 (2 pages).

* cited by examiner

*Primary Examiner*—Thai Tran
*Assistant Examiner*—Nigar Chowdhury
(74) *Attorney, Agent, or Firm*—NSIP Law

(57) ABSTRACT

An information storage medium including AV data; presentation graphics data including subtitle information corresponding to the AV data; and interactive graphics data including menu data; wherein the interactive graphics data further includes a reproducing state change navigation command to change the reproducing state of the AV data and/or the presentation graphics data.

11 Claims, 7 Drawing Sheets

INFORMATION STORAGE MEDIUM CONTAINING INTERACTIVE GRAPHICS STREAM FOR CHANGE OF AV DATA REPRODUCING STATE, AND REPRODUCING METHOD AND APPARATUS THEREOF

CROSS-REFERENCE TO RELATED APPLICATIONS

This application claims the priority of Korean Patent Application No. 2004-8345, filed on Feb. 9, 2004, in the Korean Intellectual Property Office, the disclosure of which is incorporated herein in its entirety by reference.

BACKGROUND OF THE INVENTION

1. Field of the Invention

The present invention relates to reproducing audio/video (AV) data, and, more particularly, to an information storage medium containing interactive graphics streams capable of changing the reproducing state of AV data, and a reproducing method and apparatus that use the interactive graphics streams capable of changing the reproducing state of AV data.

2. Description of the Related Art

Figure 1:
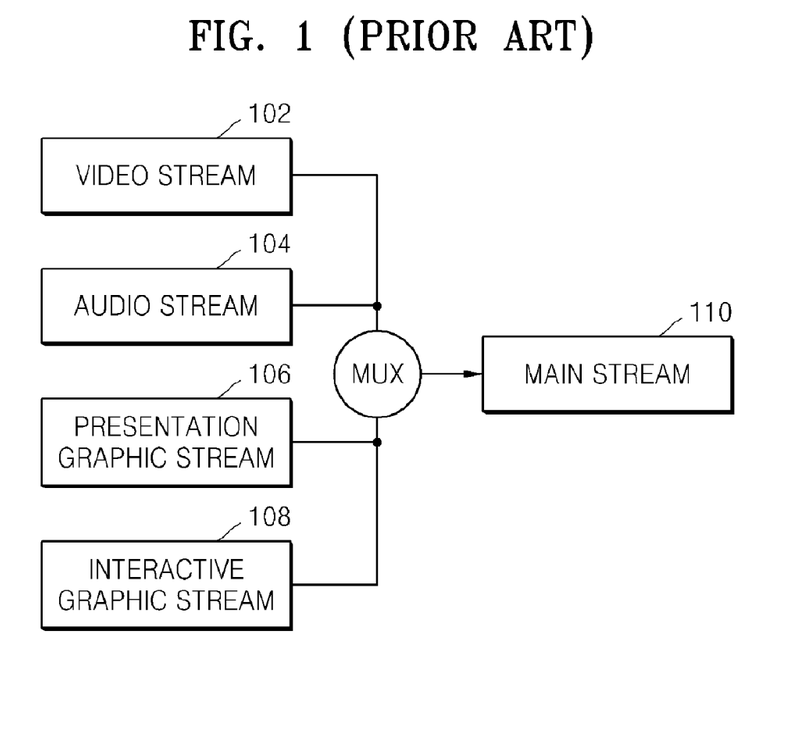
FIG. 1 is a diagram showing a variety of streams being multiplexed into a main stream.

FIG. 1 is a diagram showing a variety of streams being multiplexed into a main stream.

Referring to FIG. 1, a main stream 110 of multimedia pictures is formed by multiplexing a video stream 102, an audio stream 104, a presentation graphics stream 106 to provide subtitles, and an interactive graphics stream 108 to provide a menu containing buttons for interaction with a user. The interactive graphics stream 108 includes a plurality of segments.

Figure 2:
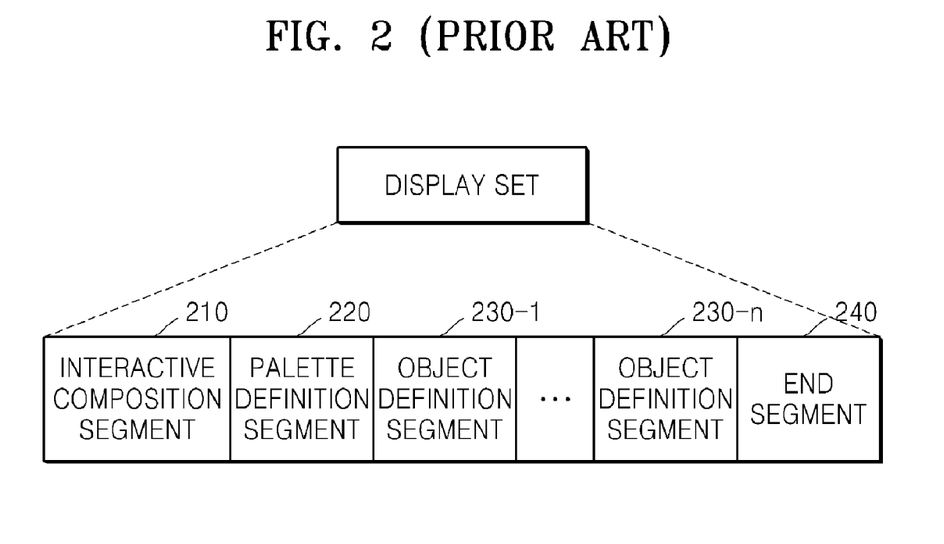
FIG. 2 is a diagram showing the structure of a display set in an interactive graphics stream.

FIG. 2 is a diagram showing the structure of a display set included in the interactive graphics stream 108.

Referring to FIG. 2, the interactive graphics stream 108 is formed with a plurality of display sets, each of which includes a plurality of segments. Each of the segments forming the display set will now be explained. An interactive composition segment (ICS) 210 defines display information of an "interactive display" in the interactive graphics stream 108. The "interactive display" is used to provide graphics elements such as a button corresponding to a command. A palette definition segment (PDS) 220 is used to define a palette which provides output colors or degrees of transparency that should be applied to pixel values in a graphics plane in relation to the interactive graphics stream 108. There can be a plurality of object definition segments (ODS) 230-1 through 230-n, which are actual graphics data in the interactive graphics stream 108. An end segment 240 is used to indicate the end of a display set.

This interactive graphics stream 108 is reproduced together with an AV stream. When a menu is displayed on the screen, in order to navigate the menu while the AV stream is being reproduced, the reproduction of AV data continues even during reproduction of the interactive graphics stream corresponding to the menu. Accordingly, some scenes of a movie may be missed during menu navigation, or if the menu box takes up a large part of the screen, important scenes may be missed.

SUMMARY OF THE INVENTION

The present invention provides an information storage medium containing an interactive graphics stream capable of changing the reproducing state of AV data when menu navigation is performed, and a reproducing method and apparatus using the medium.

Additional aspects and/or advantages of the invention will be set forth in part in the description which follows and, in part, will be obvious from the description, or may be learned by practice of the invention.

According to an aspect of the present invention, there is provided an information storage medium including: AV data; presentation graphics data including subtitle information corresponding to the AV data; and interactive graphics data including menu data, wherein the interactive graphics data further includes a reproducing state change navigation command to change the reproducing state of the AV data and/or the presentation graphics data.

The interactive graphics data may include at least one display set formed with a plurality of segments, the segments may include an interactive composition segment including composition information of the menu data, and the interactive composition segment may include the reproducing state change navigation command. The reproducing state change navigation command may be executed before the menu is displayed.

A user command corresponding to the interactive graphics data may control the reproducing state of the AV data and/or the presentation graphics data.

According to another aspect of the present invention, there is provided a method of reproducing interactive graphics data including menu data, the method comprising: receiving a reproduction command of the interactive graphics data during reproduction of AV data; and changing a reproducing state of the AV data.

A reproducing state change navigation command, which may be included in the interactive graphics data, to change the reproducing state of the AV data may be performed before changing the reproducing state of the AV data. The reproducing state change navigation command may be a command to change the reproducing state of the AV data to a "Still" state.

According to still another aspect of the present invention, there is provided a reproducing apparatus comprising: an object buffer to receive interactive graphics data comprising menu data; and a graphics controller to control the reproducing state of the received interactive graphics data, wherein the interactive graphics data includes a reproducing state change navigation command to change the reproducing state of the AV data and/or presentation graphics data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
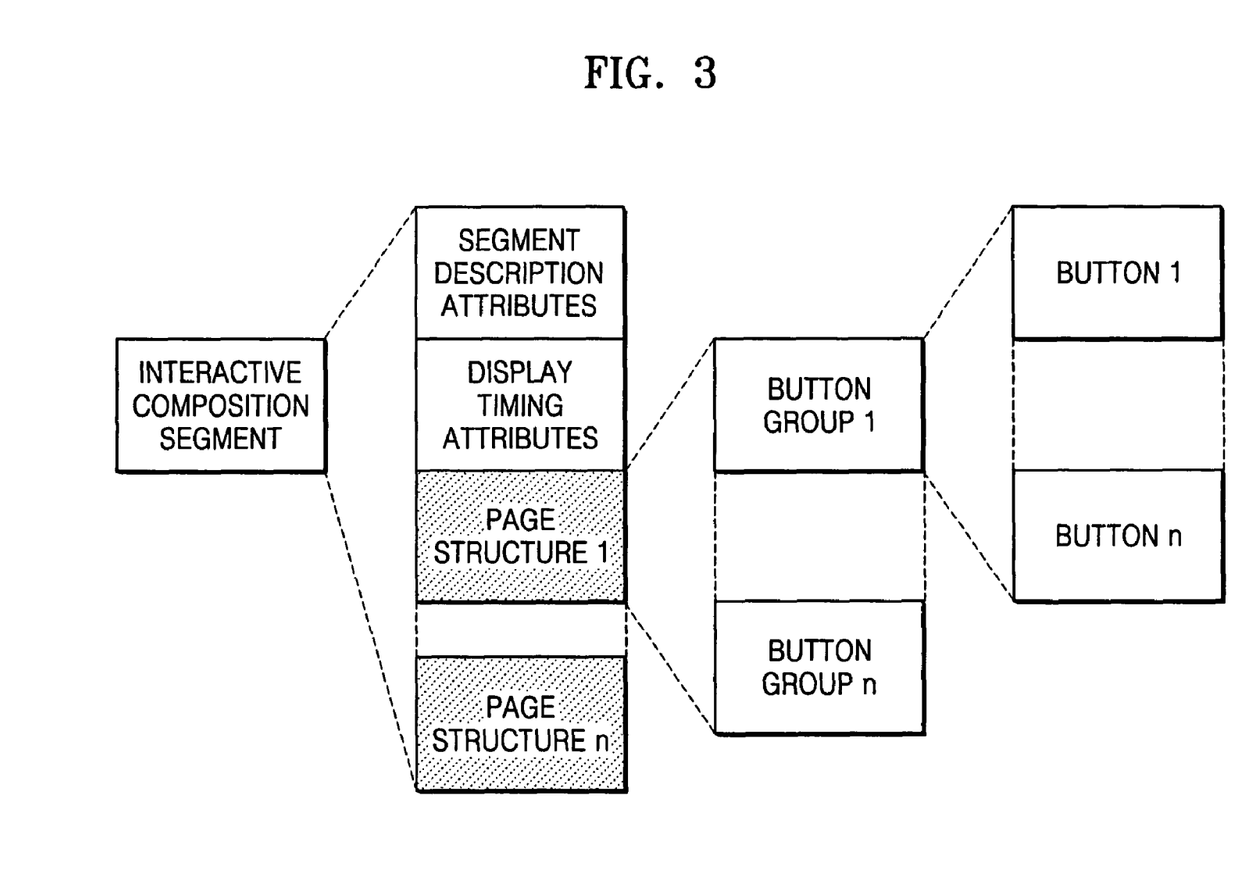
FIG. 3 is a diagram showing the structure of an interactive composition segment (ICS) in an interactive graphics stream, which is designed to implement a menu.

Referring to FIG. 3, an interactive composition segment (ICS) includes a plurality of page structures. The ICS is designed to implement a plurality of menu pages, or other forms of a graphical user interface, within a valid display period of a display set to which the ICS belongs. A page is a group of buttons forming one menu, which is distinguished from other pages by a page_id. That is, one ICS includes a plurality of pages. Both a pop-up menu and an always-on menu have identical ICS structures, and an attribute indicating that a menu implemented by the ICS is a pop-up menu or an always-on menu is written in segment description attributes.

Figure 4:
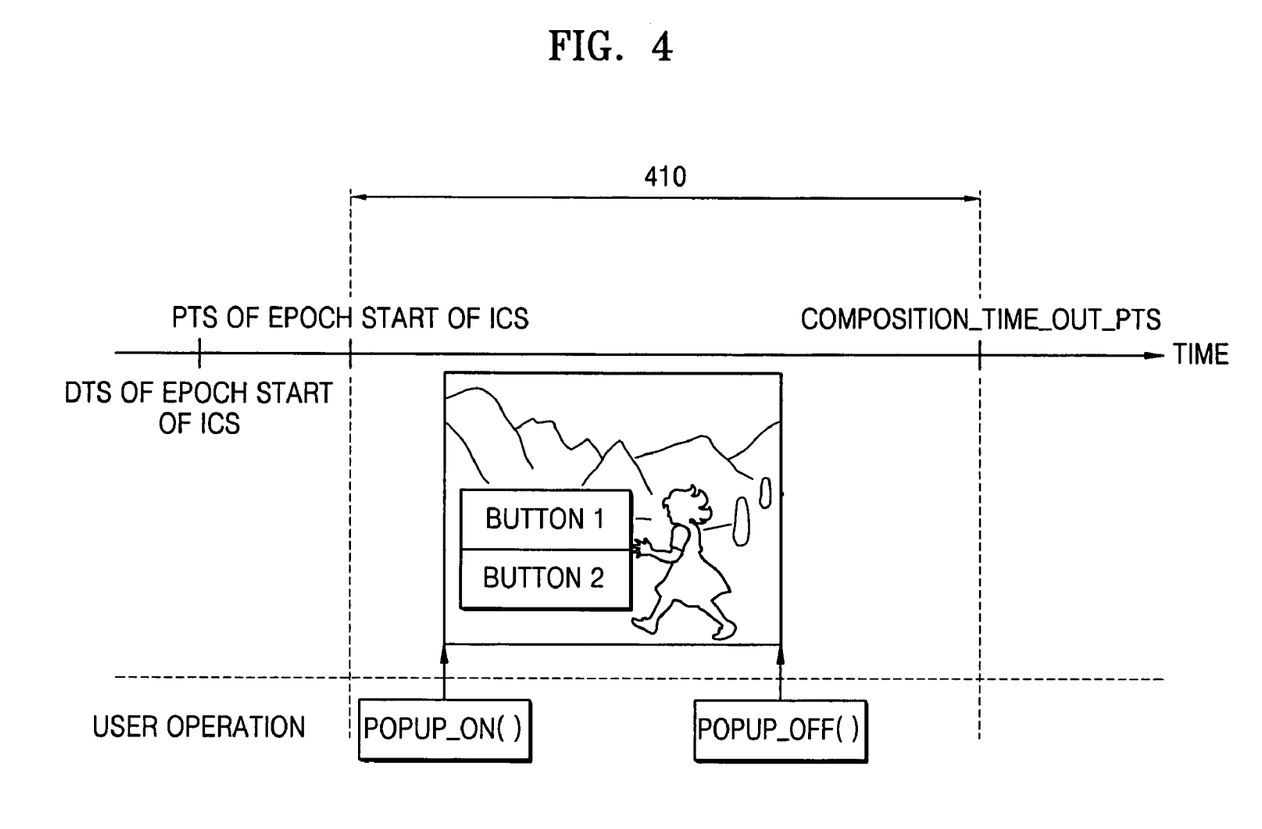
FIG. 4 is a diagram illustrating a valid display period of a pop-up menu.

FIG. 4 is a diagram illustrating a valid display period of a pop-up menu.

The pop-up menu is not displayed on the screen even when the time point at which AV data is reproduced reaches the presentation time stamp (PTS) of Epoch Start of ICS (start of new epoch of ICS), and the pop-up menu is only displayed on the screen when a button to which a user operation is allocated, such as "PopUp_on()" for a user to select to display the menu, is selected. The term "epoch" will be explained later. The menu disappears in response to a user operation such as "PopUp_off()" or at a time point of composition_time_out_pts of the ICS. The term composition_time_out_pts describes the end time of the interactive display in an epoch. At the end time, the interactive display is no longer valid and consequently shall no longer be displayed. Accordingly, the interval indicated by reference number 410, from the PTS time point of the ICS to the time point of composition_time_out_pts, is the valid display period of the pop-up menu, and the time a menu screen is actually displayed on the screen, between PopUp_on() and PopUp_off() within the valid display period, is an interactive display period.

Here, the valid display period is a valid interval in which the pop-up menu can be displayed, that is, an interval where user operations of PopUp_on()and PopUp_off()by the user can be applied. The interactive display period is an interval in which the menu is actually displayed on the screen.

The interactive graphics data stream is formed with one or more units, each referred to as an epoch, considering the operation model of an interactive graphics decoder. All interactive graphics objects in an epoch period are decoded and stored continuously in an object buffer in an interactive graphics decoder.

That is, in one epoch period, repeated use of decoded interactive graphics objects is possible. Accordingly, unless the next epoch data are input, the data are continuously maintained in the decoder, and at the moment when the current epoch ends and the next epoch begins, all buffers in the decoder are reset and all data stored in the object buffers disappears.

Each segment in one display set is written in a packetized elementary stream (PES), which is a packet unit of an MPEG-2 transport stream. Here, decoding of the display set is performed for a period corresponding to the decoding time stamp (DTS) time contained in the PES packet, and output of the packets on the screen begins at the PTS time. The output completion time of the display set is determined by a value in the composition_time_out_pts field recorded in the ICS.

Figure 5:
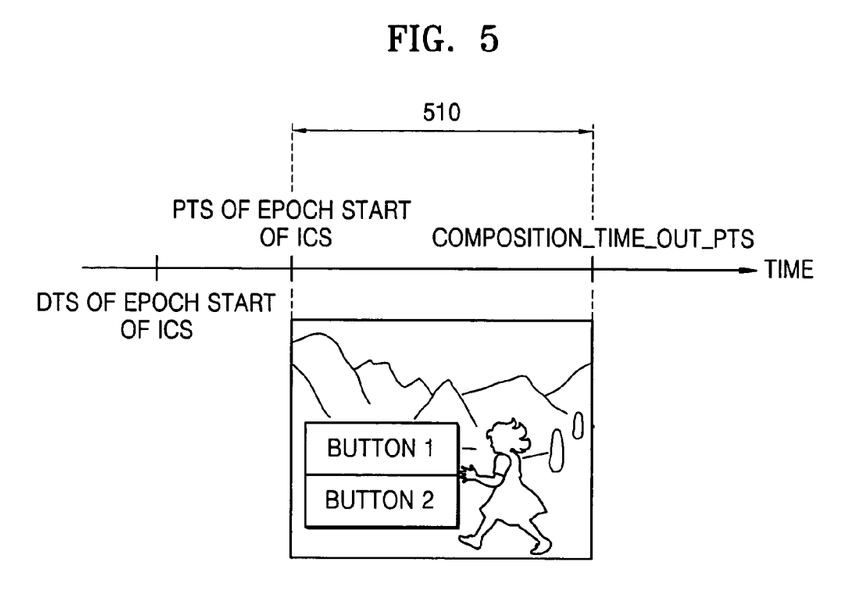
FIG. 5 is a diagram illustrating a valid display period of an always-on menu.

FIG. 5 is a diagram illustrating a valid display period of an always-on menu.

When the reproducing time point of AV data becomes the PTS of Epoch Start of ICS, the first page of the always-on menu is displayed on the screen, and at the time point of composition_time_out_pts of the ICS, the always-on menu disappears automatically. Accordingly, the interval indicated by reference number 510, from the PTS time point of the ICS and to the time point of composition_time_out_pts, is the valid display period of the always-on menu, and the valid display period is the same as the interactive display period when the menu is actually displayed on the screen.

As described above with reference to FIGS. 4 and 5, there is a difference between the pop-up menu and the always-on menu in that the pop-up menu is displayed on the screen within a valid display period in an epoch set by a user operation, while the always-on menu is displayed automatically at the PTS time point of the ICS. Each of these menus is displayed together with reproduction of AV data. Usually, even when a menu is displayed, the reproduction of AV data continues. Accordingly, a menu box is displayed during reproduction of AV data, and if a user performs menu navigation during reproduction of AV data, the scenes cannot be viewed correctly because of the part hidden by the menu box, or movie scenes that are playing during the menu navigation can be missed.

Figure 6:
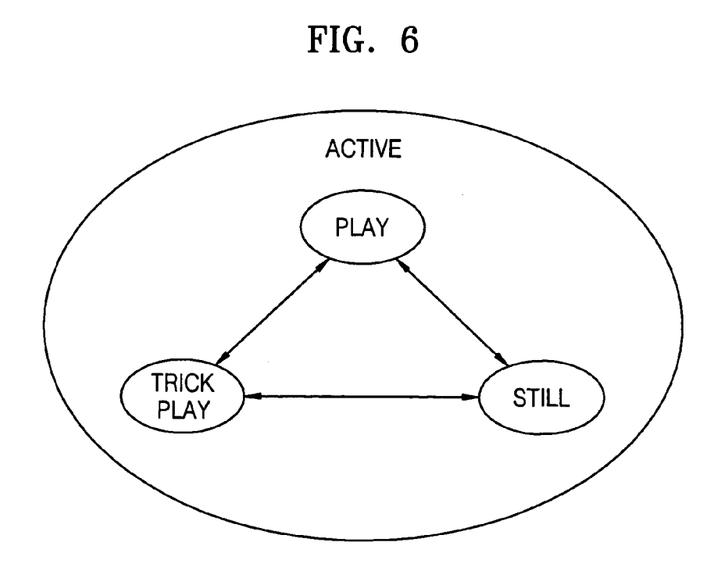
FIG. 6 is a diagram showing states that an AV presentation can have when a presentation engine is active.

FIG. 6 is a diagram showing states that an AV presentation can have when a presentation engine is active.

Referring to FIG. 6, in AV presentation, there are states such as "Play", "Trick Play", and "Still". "Play" indicates a state where reproduction is performed at a normal speed, that is, ×1.0 (speed multiplied by 1), and "Trick Play" indicates a state where reproduction is performed at a lower or higher speed than the ×1.0 speed. "Still" indicates that a last scene is continuously displayed on the screen and reproduction is performed at a speed of ×0. Accordingly, in the "Still" state, reproduction of video and audio data is temporarily stopped but the navigation system operates continuously. The "Still" state is different from a "Pause" state. In a "Pause" state, all operations, including the operations of the navigation system, stop.

Accordingly, in the present invention, a navigation command "Still", enabling a user to change the state of AV presentation from "Play" to "Still", is defined such that when a menu is displayed during reproduction of AV data, the user does not miss movie scenes. That is, according to the intention of a content manufacturer, the "Still" navigation command is made to be used so that when a menu is reproduced, reproduction of AV data can be temporarily stopped.

Figure 7:
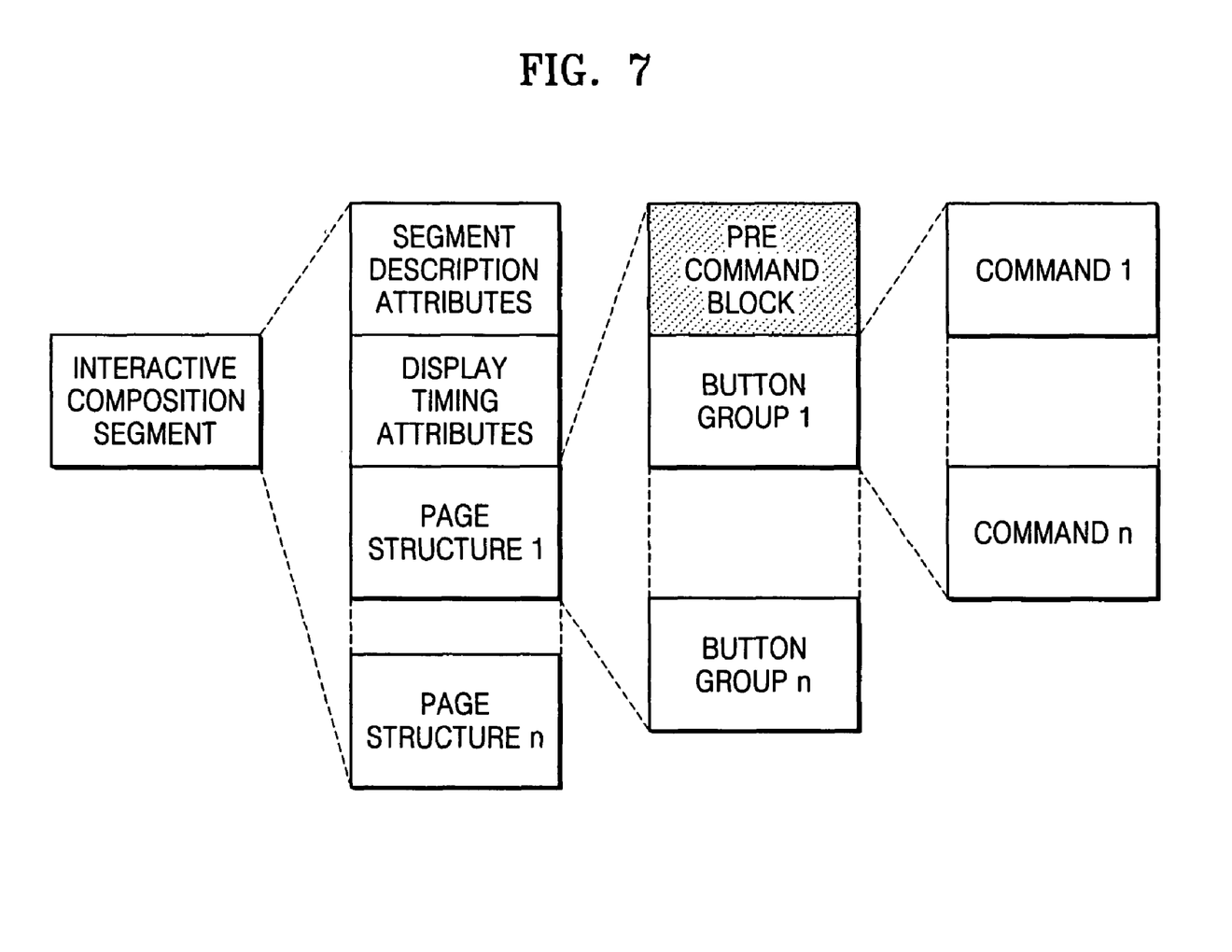
FIG. 7 is a diagram showing the structure of an ICS to which a pre-command block is added, according to an embodiment of the present invention that implements a temporary stop function. The pre-command block is added when a pop-up menu is prepared so that the reproducing state of AV data can be controlled.

FIG. 7 is a diagram showing the structure of an ICS to which a pre-command block is added, according to an embodiment of the present invention which implements a temporary stop function. The pre-command block is added when a pop-up menu is prepared so that the reproducing state of AV data can be controlled.

Referring to FIG. 7, it can be seen that a pre-command block is added to a page structure data area. The pre-command block contains navigation commands that should be executed before the page structure data containing the pre-command block are displayed on the screen. If a manufacturer wants the reproduction of AV data to be continued when a pop-up menu page defined by the ICS is executed by a user, the manufacturer can choose not to include a "Still" command in the pre-command block. Also, if the designer wants the reproduction of AV data to stop temporarily, the manufacturer can include a "Still" command in the pre-command block so that reproduction of AV data can be temporarily stopped before the menu page is displayed.

Figure 8:
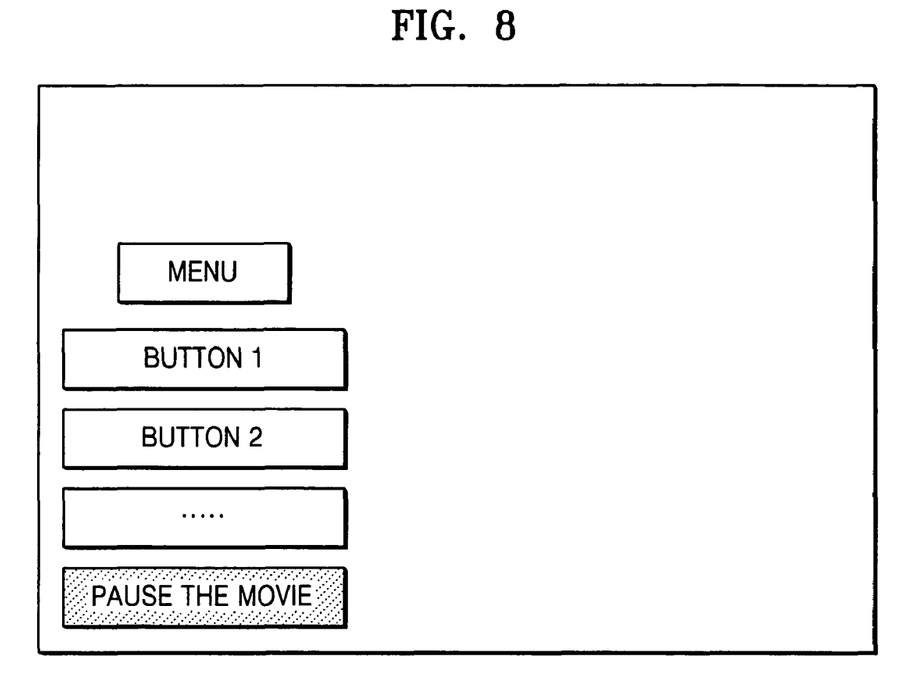
FIG. 8 is a diagram showing the structure of an ICS to which a "Still" command is allocated in a menu screen, according to another embodiment of the present invention that implements a temporary stop function.

FIG. 8 is a diagram showing the structure of an ICS to which a "Still" command is allocated in a menu screen, according to another embodiment of the present invention that implements a temporary stop function.

Referring to FIG. 8, in this embodiment, a manufacturer can provide a menu screen to display on the screen in which a "Still" command is allocated to a predetermined button, such that according to user selection, the reproducing state of AV can be changed to a temporary stop state.

As described above, by using the "Still" navigation command changing the state of AV presentation from "Play" to "Still", when a pop-up menu or an always-on menu is executed, the reproducing state of AV data can be controlled according to the intention of the manufacturer.

Figure 9:
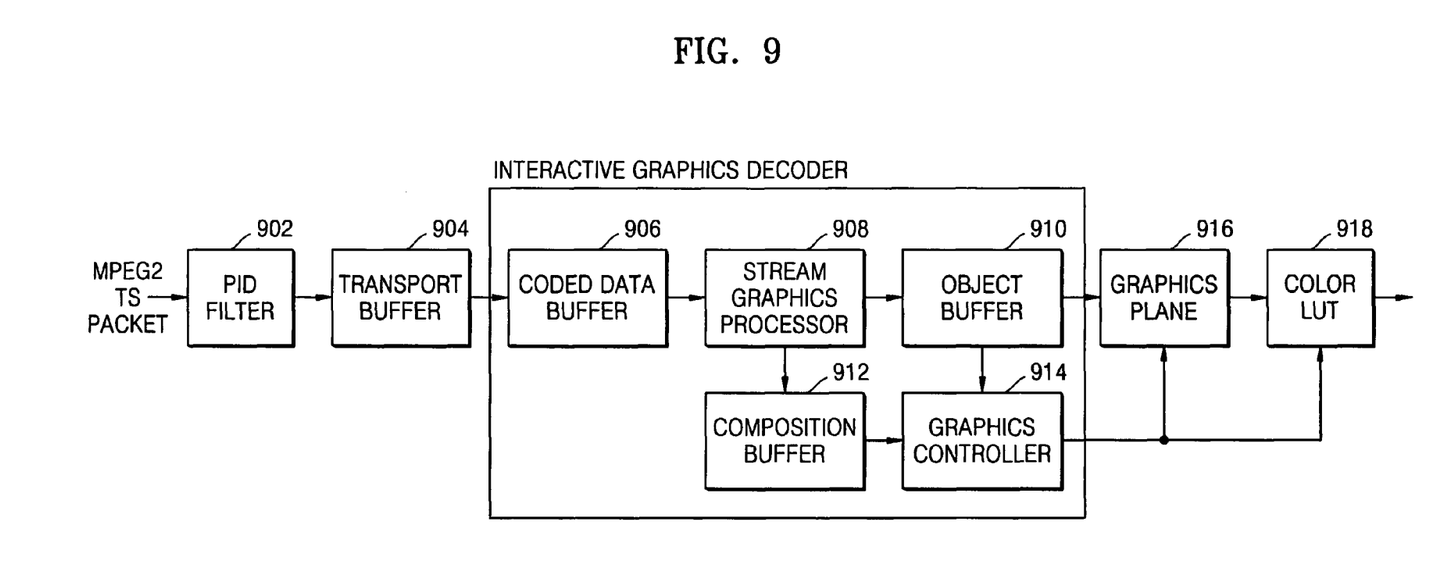
FIG. 9 is a diagram showing a reproducing apparatus according to an embodiment of the present invention which reproduces an interactive graphics stream.

FIG. 9 is a diagram showing a reproducing apparatus according to an embodiment of the present invention that reproduces an interactive graphics stream.

Referring to FIG. 9, a block diagram of an interactive graphics decoder of a reproducing apparatus according to an embodiment of the present invention is provided. In an MPEG-2 TS packet, which is a main stream read out from a storage medium, only an interactive graphics stream is selectively taken and transferred to a transport buffer 904, and then transmitted to an interactive graphics decoder. In a coded data buffer 906, data to be decoded is stored. In a stream graphics processor 908, the data is decoded and object data for button images is transmitted to an object buffer 910, and composition information is transmitted to a composition buffer 912 such that screen output of the interactive graphics stream is controlled.

Upon reaching the PTS time, corresponding to the start of screen output of the interactive graphics stream, the composition buffer 912 controls a graphics controller 914 such that images to be output on the current screen are determined and transmitted from the object buffer 910 to a graphics plane 916, and color information is transmitted to a color look-up table 918 to form an interactive graphics stream on the screen. Also, the graphics controller 914 receives an input from the user and changes the button state in response to position movement of or selection of a button, and indicates the result on the screen output.

Meanwhile, the embodiments of the interactive graphics stream reproduction method described above can be written as a computer program. Codes and code segments forming the programs can be easily inferred by a computer programmer in the field. The program may be stored in an information storage medium, and read and executed by a computer such that the method is implemented. Examples of the information storage medium include magnetic storage media, and optical recording media.

The embodiments presented in this description should be considered in a descriptive sense only, and not for purposes of limitation. Therefore, the scope of the invention is defined not by the detailed description of the invention but by the appended claims, and all differences within the scope will be construed as being included in the present invention.

According to the present invention as described above, the method capable of controlling the state of AV presentation, that is, the state of a presentation engine, when a pop-up menu or an always-on menu is displayed, is provided. Accordingly, the present invention enables a manufacturer or a user to maintain or temporarily stop the reproduction of AV data when a menu is reproduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable storage medium implemented by at least one reproducing apparatus, the non-transitory computer-readable storage medium comprising:
   AV data;
   presentation graphics data including subtitle information corresponding to the AV data; and
   interactive graphics data including a second command,
   wherein if a first command used to display a menu during reproduction of the AV data is received, the second command, which is included in a predetermined button defined in the interactive graphics data and automatically executed when the interactive graphics data is reproduced by the at least one reproducing apparatus, is used by the at least one reproducing apparatus to change a reproducing state of the AV data, and
   the interactive graphics data comprises at least one display set formed with a plurality of segments, the segments include an interactive composition segment including composition information of menu data, and the interactive composition segment includes the second command.

2. The non-transitory computer-readable storage medium of claim 1, wherein the second command is executed before the menu, corresponding to menu data of the interactive graphics data, is displayed.

3. The non-transitory computer-readable storage medium of claim 1, wherein the second command changes the reproducing state of the AV data and/or the presentation graphics data to a Still state.

4. The non-transitory computer-readable storage medium of claim 1, wherein a user command corresponding to the interactive graphics data controls the reproducing state of the AV data and/or the presentation graphics data.

5. The non-transitory computer-readable storage medium of claim 4, wherein the user command changes the reproducing state of the AV data and/or the presentation graphics data to a Still state.

6. A reproducing apparatus which reproduces interactive graphics data including menu data, the reproducing apparatus comprising:
   a graphics controller to receive a first command that instructs to display a menu during reproduction of AV data and to change a reproducing state of the AV data in response to a second command included in a predetermined button defined in the interactive graphics data, the second command automatically executing when the interactive graphics data is reproduced, wherein the interactive graphics data comprises at least one display set formed with a plurality of segments, the segments include an interactive composition segment including composition information of menu data, and the interactive composition segment includes the second command.

7. The apparatus of claim 6, wherein a user command corresponding to the interactive graphics data controls the reproducing state of the AV data and/or the presentation graphics data.

8. The apparatus of claim 6, further comprising:
a coded data buffer to store and transmit coded interactive graphics data;
a stream graphics processor to decode the coded data and transmit object data of one or more user interaction images to the object buffer; and
a composition buffer to receive composition information from the stream graphics processor to control screen output of the interactive graphics data.

9. The apparatus of claim 8, further comprising:
a graphics controller controlled by the composition buffer such that images to be displayed are determined and transmitted from the object buffer;
wherein the graphics controller receives an input from a user and changes states of the one or more user interaction images, indicating the changed state on the screen output.

10. A non-transitory computer-readable storage medium implemented by at least one reproducing apparatus, the non-transitory computer-readable storage medium comprising:
interactive graphics data including a second command;
wherein if a first command used by the at least one reproducing apparatus to reproduce the interactive graphics data during reproduction of AV data is received, the second command, included in a predetermined button defined in the interactive graphics data, is used by the at least one reproducing apparatus to change a reproducing state of the AV data, the second command automatically executing when the interactive graphics data is reproduced by the at least one reproducing apparatus.

11. The non-transitory computer-readable storage medium of claim 10, wherein the first command is selected from the interactive graphics data through a peripheral computer device.

* * * * *